(12) United States Patent
Noda et al.

(10) Patent No.: US 9,663,603 B2
(45) Date of Patent: *May 30, 2017

(54) CURABLE COMPOSITION AND POLYMER

(75) Inventors: Tetsuya Noda, Hiroshima (JP);
Fuminori Nakaya, Hiroshima (JP);
Hajime Okutsu, Aichi (JP)

(73) Assignee: MITSUBISHI RAYON CO., LTD., Tokyo (JP)

( * ) Notice: Subject to any disclaimer, the term of this patent is extended or adjusted under 35 U.S.C. 154(b) by 368 days.

This patent is subject to a terminal disclaimer.

(21) Appl. No.: 14/123,147

(22) PCT Filed: May 31, 2012

(86) PCT No.: PCT/JP2012/064024
§ 371 (c)(1),
(2), (4) Date: Nov. 29, 2013

(87) PCT Pub. No.: WO2012/165521
PCT Pub. Date: Dec. 6, 2012

(65) Prior Publication Data
US 2014/0094581 A1    Apr. 3, 2014

(30) Foreign Application Priority Data

May 31, 2011 (JP) .................. 2011-121776

(51) Int. Cl.
*C08F 226/06* (2006.01)
*C08F 26/06* (2006.01)
(Continued)

(52) U.S. Cl.
CPC ............. *C08F 226/06* (2013.01); *C08F 2/38* (2013.01); *C08F 26/06* (2013.01); *C08F 220/14* (2013.01);
(Continued)

(58) Field of Classification Search
CPC .......... C08F 226/06; C08F 26/06; C08F 2/46; C08F 2/48; C08F 2/50; C08F 2/54; C09D 133/16; C09D 139/04
See application file for complete search history.

(56) References Cited

U.S. PATENT DOCUMENTS 4,210,612 A * 7/1980 Karrer .................. C07D 211/46
525/204
5,047,489 A * 9/1991 Ravichandran ......... C08F 12/26
526/263

(Continued)

FOREIGN PATENT DOCUMENTS

JP    10 176016    6/1998
JP    10 219140    8/1998
(Continued)

OTHER PUBLICATIONS

Hlgaki, Yuji et al, "A Thermodynamic Polymer Cross-Linking system Based on Radically Exachangeable Covalent Bonds", Feb. 28, 2006, Macromolecules, vol. 39 No. 6, p. 2121-2125.*

(Continued)

*Primary Examiner* — Ling Choi
*Assistant Examiner* — David L Miller
(74) *Attorney, Agent, or Firm* — Oblon, McClelland, Maier & Neustadt, L.L.P.

(57) ABSTRACT

An object of the invention is to provide a curable composition having a HALS skeleton and capable of producing polymers having excellent weather resistance and outer appearance. The present invention provides a curable composition including at least a monomer component that contains a monomer (A) represented by a certain formula and a monomer (B) polymerizable with the monomer (A). In the curable composition, the content of the monomer (A) is 0.01 to 35 mol % in the monomer component, and the content of (Continued)

the monomer (B) is 65 to 99.99 mol % in the monomer component.

8 Claims, 1 Drawing Sheet

(51) Int. Cl.

| | | |
|---|---|---|
| *C09D 133/16* | (2006.01) | |
| *C09D 139/04* | (2006.01) | |
| *C08F 220/14* | (2006.01) | |
| *C08F 220/36* | (2006.01) | |
| *C08F 2/38* | (2006.01) | |
| *C08F 2/54* | (2006.01) | |
| *C08F 2/48* | (2006.01) | |
| *C08F 2/50* | (2006.01) | |
| *C08F 2/46* | (2006.01) | |

(52) U.S. Cl.
CPC .......... *C08F 220/36* (2013.01); *C09D 133/16* (2013.01); *C09D 139/04* (2013.01); *C08F 2/46* (2013.01); *C08F 2/48* (2013.01); *C08F 2/50* (2013.01); *C08F 2/54* (2013.01); *C08L 2312/00* (2013.01)

(56) References Cited

U.S. PATENT DOCUMENTS

| 5,189,084 | A * | 2/1993 | Birbaum | ............... C07D 251/24 |
| | | | | 524/100 |
| 6,251,986 | B1 | 6/2001 | Ide et al. | |
| 8,912,287 | B2 * | 12/2014 | Nakaya | ................. C08F 220/14 |
| | | | | 525/191 |
| 2006/0229407 | A1 | 10/2006 | Vogel et al. | |
| 2009/0104447 | A1 * | 4/2009 | Kita | ............................ C08J 7/04 |
| | | | | 428/412 |
| 2009/0318581 | A1 * | 12/2009 | Ota | ........................ C08F 283/10 |
| | | | | 522/148 |
| 2012/0245318 | A1 * | 9/2012 | Nakaya | ................. C08F 220/14 |
| | | | | 526/263 |

FOREIGN PATENT DOCUMENTS

| JP | 2000 103924 | 4/2000 | |
| JP | 2000 509082 | 7/2000 | |
| JP | 2001 210314 | 8/2001 | |
| JP | 2001 210365 | 8/2001 | |
| JP | 2002 211110 | 7/2002 | |
| JP | 2006 526670 | 11/2006 | |
| JP | 2008 056906 | 3/2008 | |
| JP | 2008 127527 | 6/2008 | |
| JP | 2008 231307 | 10/2008 | |
| JP | 2010 215902 | 9/2010 | |
| JP | WO 2011068110 A1 * | 6/2011 | ............ C08F 220/14 |

OTHER PUBLICATIONS

Higaki, Yuji et al, "Dynamic Formation of Graft Polymers via Radical Crossover Reaction of Alkoxyamines", Jan. 28, 2004, Macromolecules, 37, 1696-1701.*

International Search Report Issued Jun. 26, 2012 in PCT/JP12/64024 Filed May 31, 2012.

U.S. Appl. No. 14/123,158, filed Nov. 29, 2013, Nakaya, et al.

* cited by examiner

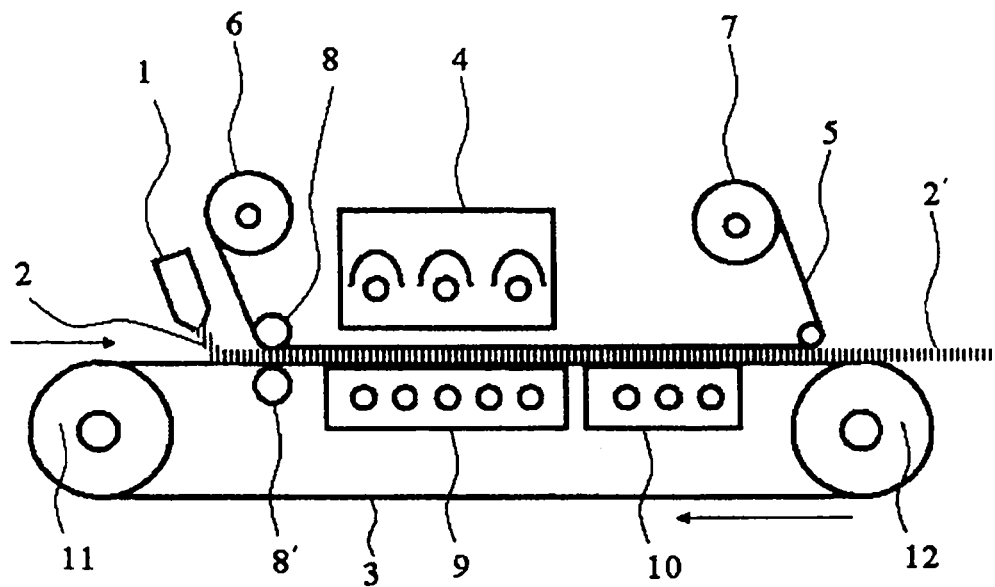

CURABLE COMPOSITION AND POLYMER

TECHNICAL FIELD

The present invention relates to a curable composition.

BACKGROUND ART

As has been well known, ultraviolet rays in the sunlight degrades polymers by breaking the chemical bonds in the polymers. In order to prevent such degradation, light stabilizers, ultraviolet absorbers, or the like are added to polymer products such as plastics, fibers, and paints. In particular, a hindered amine light stabilizer (hereinafter referred to as HALS) is said to have a function of preventing a polymer material from being degraded because the HALS hardly absorb the ultraviolet ray while efficiently scavenging harmful free radicals generated by ultraviolet rays.

A typical HALS, however, is not chemically bonded to a polymer material. Thus, the HALS may bleed out from the polymer material if exposed outdoors for a long time. Therefore, it has been pointed out that such bleeding out of the HALS may lead to the loss of the original functions of the HALS. For suppressing the bleeding out of the HALS from the polymer material, a high molecular weight HALS prepared from methacrylic acid piperidyl ester has been studied (see, Patent Documents 1 to 3).

CITATION LIST

Patent Literature

Patent Document 1: JP-A-10-176016
Patent Document 2: JP-A-2008-56906
Patent Document 3: JP-T-2000-509082

SUMMARY OF INVENTION

Technical Problem

However, when the compounds disclosed in Patent Documents 1 to 3 are applied to active energy ray-curable resins, phase separation may be caused depending on the amounts of the compounds added as well as the types of the resins. In addition, when such compounds are applied to active energy ray-curable resins, such compounds may not effectively provide the effects as the HALS in the presence of acids.

Hence, the present invention intends to provide a curable composition capable of producing a polymer having a HALS skeleton with excellent weather resistance and outer appearance.

Solutions to Problem

The following aspects of the invention [1] to [8] are solutions to the above problem.
[1] A curable composition that contains a monomer component containing: a monomer (A) represented by formula (1) below; and a monomer (B) polymerizable with the monomer (A), in which
the content of the monomer (A) is 0.01 to 35 mol % in the monomer component, and
the content of the monomer (B) is 65 to 99.99 mol % in the monomer component.

[Chemical Formula 1]

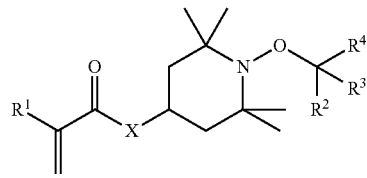

(1)

In the formula (1), $R^1$ represents a hydrogen atom or a methyl group; X represents an oxygen atom, an imino group, a compound represented by formula (2) below or a compound represented by formula (3) below; and $R^2$, $R^3$ and $R^4$ each represent a hydrogen atom, a linear alkyl group having 1 to 8 carbon atoms, a branched linear alkyl group having 1 to 8 carbon atoms, a substituted or unsubstituted cycloalkyl group having 6 to 8 carbon atoms, or a substituted or unsubstituted aryl group having 6 to 12 carbon atoms, where $R^2$, $R^3$ and $R^4$ may be the same or different from one another, a combination of $R^2$ and $R^3$, $R^2$ and $R^4$, $R^3$ and $R^4$, or $R^2$, $R^3$ and $R^4$ may form a ring structure and the ring structure may have a substituted group.

[Chemical Formula 2]

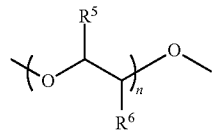

(2)

In the formula (2), n representing an integer of 1 to 10; $R^5$ and $R^6$ each represents a hydrogen atom or a methyl group; and at least one of $R^5$ and $R^6$ represents a hydrogen atom.

[Chemical Formula 3]

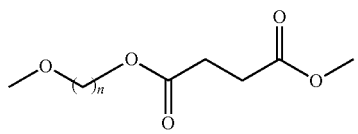

(3)

In the formula (3), n represents an integer of 1 to 10.
[2] The curable composition according to the above [1], further including a polymer containing a monomer (C) polymerizable with the monomer (A).
[3] The curable composition according to the above [1] or [2], in which the monomer (B) contains methyl methacrylate at the content of 50 mol % or more.
[4] A method of manufacturing a polymer, including: polymerizing the curable composition according to any one of the above [1] to [3] with irradiation of active energy ray.
[5] A resin sheet produced by polymerizing the curable composition according to any one of the above [1] to [3].
[6] The resin sheet according to the above [5], in which the total light transmittance is 85 to 100%, and haze value is less than 5%.
[7] A cured coating film produced by applying the curable composition according to any one of the above [1] to [3] to a substrate and subsequently polymerizing the curable composition.

[8] The cured coating film according to the above [7], in which the total light transmittance is 85 to 100%, and haze value is less than 5%.

Effects of Invention

Using the curable composition according to any aspect of the invention, a polymer with excellent weather resistance and outer appearance can be obtained.

BRIEF DESCRIPTION OF THE DRAWINGS

FIG. 1 is a schematic diagram illustrating an exemplary apparatus for producing a resin sheet.

DESCRIPTION OF EMBODIMENTS

The curable composition according to the invention includes at least a monomer component that includes: a polymerizable monomer (A) having a HALS skeleton serving as a light stabilizer; and a monomer (B) polymerizable with the monomer (A). The curable composition may further contain a radical polymerization initiator (C). The polymerization of the curable composition may be initiated by active energy rays.

Since the polymer obtained from the curable composition according to the invention includes the polymerizable monomer unit having the HALS skeleton, the polymer can be prevented from bleeding out even after experiencing a weather resistant test for a long time. In addition, since the monomer (A) is favorably compatible with the monomer (B) added to the composition, the obtained polymer can be highly transparent and excellent in outer appearance.

In the description made below, the invention will be described in detail.

<Monomer (A)>

The polymerizable monomer (A) having the HALS skeleton (hereinafter abbreviated as monomer (A)) is represented by the following formula (1).

[Chemical Formula 4]

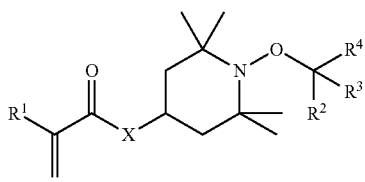

(1)

In the formula (1), $R^1$ represents a hydrogen atom or a methyl group. X represents an oxygen atom, an imino group, a compound represented by formula (2) below or a compound represented by formula (3) below. $R^2$, $R^3$ and $R^4$ each represent a hydrogen atom, a linear alkyl group having 1 to 8 carbon atoms, a branched linear alkyl group having 1 to 8 carbon atoms, a substituted or unsubstituted cycloalkyl group having 6 to 8 carbon atoms, or a substituted or unsubstituted aryl group having 6 to 12 carbon atoms. $R^2$, $R^3$ and $R^4$ may be the same or different from one another. Further, a combination of $R^2$ and $R^3$, $R^2$ and $R^4$, $R^3$ and $R^4$, or $R^2$, $R^3$ and $R^4$ may form a ring structure. Such ring structure may have a saturated group.

[Chemical Formula 5]

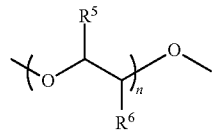

(2)

In the formula (2), n represents an integer of 1 to 10. $R^5$ and $R^6$ each represent a hydrogen atom or a methyl group. At least one of $R^5$ and $R^6$ represents a hydrogen atom.

[Chemical Formula 6]

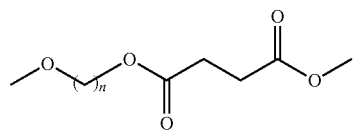

(3)

In the formula (3), n represents an integer of 1 to 10.

In the formula (1), X preferably represents an oxygen atom. With such configuration, the synthesis of the monomer (A) is facilitated. Further, in the formula (2), $R^5$ and $R^6$ both preferably represent hydrogen atoms respectively because of ease of synthesis of the monomer (A).

In the formula (1), X is represented such that an oxygen atom at the right end of the compound represented by any of the formulae (2) and (3) is bonded to the carbon atom of the piperidine ring in the formula (1).

In the above formula (1), it is preferred that (i) $R^2$ to $R^4$ all represent hydrogen atoms, and alternatively (ii) any two of $R^2$ to $R^4$ preferably represent hydrogen atoms while one of the remainder represents a linear alkyl group having 1 to 8 carbon atoms or a branched linear alkyl group having 1 to 8 carbon atoms. With this configuration, the coloring at the time of the polymerization or the molding is reduced, and the obtained products have favorable weather resistance.

When the monomer (B) contains methyl methacrylate at the content of 50 mol % or more and the polymer (C) contains methyl methacrylate unit at the content of 50 mass % or more, the number of the carbon atoms contained in the linear or branched linear alkyl group is preferably 1 to 6 and more preferably 1 to 4. With this configuration, favorable compatibility is obtained.

Examples of the substitute are a linear or branched linear alkyl group having 1 to 4, a hydroxyl group, a phosphate ester group or a halogen atom.

Examples of the monomer (A) are 1-octyloxy-2,2,6,6-tetramethyl-4-(meth) acryloyloxy piperidine, 1-octyloxy-2,2,6,6-tetramethyl-4-(meth)acrylamide piperidine, 1-propyloxy-2,2,6,6-tetramethyl-4-(meth)acryloyloxy piperidine, 1-propyloxy-2,2,6,6-tetramethyl-4-(meth)acrylamide piperidine, 1-cyclohexyloxy-2,2,6,6-tetramethyl-4-(meth)acryloyloxy piperidine, 1-cyclohexyloxy-2,2,6,6-tetramethyl-4-(meth)acrylamide piperidine, 1-methyloxy-2,2,6,6-tetramethyl-4-(meth)acryloyloxy piperidine, 1-methyloxy-2,2,6,6-tetramethyl-4-(meth)acrylamide piperidine, 1-octyloxy-2,2,6,6-tetramethyl-4-(2-(2-(meth)acryloyloxy)ethoxy)ethoxy piperidine, and 1-octyloxy-2,2,6,6-tetramethyl-4-(4-(2-(meth)acryloyloxy)ethoxy-1,4-dioxo) butoxy piperidine.

Among the above compounds, the preferable compounds are 1-methyloxy-2,2,6,6-tetramethyl-4-(meth)acryloyloxy piperidine, 1-propyloxy-2,2,6,6-tetramethyl-4-methacryloyloxy piperidine, 1-octyloxy-2,2,6,6-tetramethyl-4-(2-(2-methacryloyloxy)ethoxy)ethoxy piperidine, 1-octyloxy-2,2,6,6-tetramethyl-4-(4-(2-methacryloyloxy)ethoxy-1,4-dioxo)butoxy piperidine, and 1-octyloxy-2,2,6,6-tetramethyl-4-(meth)acryloyloxy piperidine. Thus, the obtained products can have favorable weather resistance.

The monomer (A) may be a single compound or a combination of two or more compounds.

In this description, (meth)acryl means acryl or methacryl. In addition, (meth)acryloyl means acryloyl or methacryloyl.

The monomer (A) can be synthesized by a known method.

For instance, 1-octyloxy-2,2,6,6-tetramethyl-4-methacryloyloxy piperidine (hereinafter referred to as "monomer unit (A-1)") is synthesized in the following manner. Specifically, in the presence of sodium tungstate, 4-hydroxy-2,2,6,6-tetramethyl piperidine is oxidized using hydrogen peroxide solution of 30% concentration. Then, the hydroxyl group contained in the obtained 4-hydroxy-2,2,6,6-tetramethyl piperidine-N-oxide is protectively acetylated with acetic acid anhydride. By using octane as the solvent and the reactant, the 4-hydroxy-2,2,6,6-tetramethyl piperidine-N-oxide is reacted with t-butyl hydroperoxide, so that the acetyl protection is deprotected. Subsequently, the 4-hydroxy-2,2,6,6-tetramethyl piperidine-N-oxide is reacted with methacryloyl chloride, and the monomer (A-1) is synthesized.

Further, the synthesis of the monomer (A-1) can be conducted by a method disclosed in JP-T-2008-519003.

Specifically, in the presence of sodium tungstate dehydrate, triacetonamine is oxidized using hydrogen peroxide solution of 30% concentration, and converted into triacetoneamine-N-oxide. Then, the triacetoneamine-N-oxide is reacted with 1-octane and t-butyl hydroperoxide, and reduced by Ru-supported charcoal and hydrogen. The thus-obtained mixture of 4-hydroxy-1-(1-octyloxy)-2,2,6,6-tetramethyl piperidine and 4-hydroxy-1-(3-octyloxy)-2,2,6,6-tetramethyl piperidine is reacted with methacryloyl chloride, and the monomer (A-1) is synthesized.

In addition, 1-propyloxy-2,2,6,6-tetramethyl-4-methacryloyloxy piperidine (hereinafter referred to as "monomer (A-2)") can be synthesized according to the method disclosed in JP-T-2008-519003, using propylene in place of 1-octane.

Further, 1-octyloxy-2,2,6,6-tetramethyl-4-(2-(2-methacryloyloxy)ethoxy) ethoxy piperidine (hereinafter referred to as "monomer (A-3)") is synthesized in the following manner. Specifically, the hydroxyl group contained in 2,2,6,6-tetramethyl-4-(2-(2-hydroxy ethoxy)ethoxy piperidine-N-oxide is protectively acetylated using acetic acid anhydride. By using octane as the solvent and the reactant, the 2,2,6,6-tetramethyl-4-(2-(2-hydroxy ethoxy)ethoxy piperidine-N-oxide is reacted with t-butyl hydroperoxide, so that the acetyl protection is deprotected. Subsequently, the 2,2,6,6-tetramethyl-4-(2-(2-hydroxy ethoxy)ethoxy piperidine-N-oxide is reacted with methacryloyl chloride, and the monomer (A-3) is synthesized.

Further, 1-octyloxy-2,2,6,6-tetramethyl-4-(4-(2-methacryloyloxy)ethoxy-1,4-dioxy) butoxy piperidine (hereinafter referred to as "monomer (A-4)") is synthesized in the following manner. Specifically, in the presence of sodium tungstate, 4-hydroxy-2,2,6,6-tetramethyl piperidine is oxidized using hydrogen peroxide solution of 30% concentration. Then, the hydroxyl group in the obtained 4-hydroxy-2,2,6,6-tetramethyl piperidine-N-oxide is protectively acetylated using acetic acid anhydride. By using octane as the solvent and the reactant, the 4-hydroxy-2,2,6,6-tetramethyl piperidine-N-oxide is reacted with t-butyl hydroperoxide, so that the acetyl protection is deprotected. Subsequently, succinic anhydride is added. By subjecting the obtained carboxylic acid and 2-hydroxyethyl methacrylate to dehydration condensation, the monomer (A-4) is synthesized.

In addition, 1-methyloxy-2,2,6,6-tetramethyl-4-methacryloyloxy piperidine (hereinafter referred to as "monomer unit (A-5)") is synthesized in the following manner. Specifically, according to the method disclosed in JP-T-2009-541428, 1-methyloxy-2,2,6,6-tetramethyl-4-hydroxy piperidine is synthesized. Then, the obtained 1-methyloxy-2,2,6,6-tetramethyl-4-hydroxy piperidine is reacted with methacryloyl chloride, and the monomer (A-5) is synthesized.

More specifically, in the presence of copper chloride (I), 2,2,6,6-tetramethyl-4-hydroxy piperidine-N-oxide is reacted with acetone and hydrogen peroxide solution of 30% concentration. Then, the obtained 1-methyloxy-2,2,6,6-tetramethyl-4-hydroxy piperidine is reacted with methacryloyl chloride, and the monomer (A-5) is synthesized.

The content of the monomer (A) in the monomer component is 0.01 to 35 mol %, preferably 0.05 to 20 mol %, and more preferably 0.05 to 5 mol %. When the content of the monomer (A) is 0.01 mol % or more, the cured coating film has sufficient weather resistance. As the result, the degradation of the cured coating film is effectively prevented. When the content of the monomer (A) is 35 mol % or less, the insufficient curing of the coating is effectively prevented. As the result, the toughness, heat resistance and wear resistance of the cured coating film are further enhanced.

<Monomer (B)>

The monomer (B) is a polymerizable monomer other than the monomer (A). The monomer (B) is not limited to a specific one as long as it is polymerizable with the monomer (A). Examples of the monomer (B) are monofunctional (meth)acrylate or polyfunctional (meth)acrylate. The monomer (B) may be suitably selected according to the required specifications of the coating. Other examples of the polymerizable monomer usable as the monomer (B) are urethane (meth)acrylate, epoxy (meth)acrylate, polyester (meth)acrylate, or a monomer having a polymerizable unsaturated bond such as organic-inorganic hybrid (meth)acrylate obtained by condensing colloidal silica and (meth)acryloyloxy alkoxysilane.

Examples of monofunctional (meth)acrylate applicable as the monomer (B) are mono(meth)acrylate such as methyl (meth)acrylate, ethyl (meth)acrylate, butyl (meth)acrylate, propyl (meth)acrylate, n-butyl (meth)acrylate, i-butyl (meth)acrylate, t-butyl (meth)acrylate, hexyl (meth)acrylate, 2-ethylhexyl (meth)acrylate, lauryl (meth)acrylate, stearyl (meth)acrylate, morpholyl (meth)acrylate, 2-hydroxyethyl (meth)acrylate, 2-hydroxypropyl (meth)acrylate, 4-hydroxybutyl (meth)acrylate, glycidyl (meth)acrylate, dimethylaminoethyl (meth)acrylate, diethylaminoethyl (meth)acrylate, tricyclodecane (meth)acrylate, polyethyleneglycol mono (meth)acrylate, cyclohexyl (meth)acrylate, tetrahydrofurfuryl (meth)acrylate, dicyclopentanyl (meth)acrylate, dicyclopentenyl (meth)acrylate, isobornyl (meth)acrylate, allyl (meth)acrylate, 2-ethoxyethyl (meth)acrylate, benzyl (meth)acrylate, phenoxyethyl (meth)acrylate or phenyl (meth)acrylate, or mono(meth)acrylate compound such as an adduct of acid phthalic anhydride and 2-hydroxyethyl (meth)acrylate.

Examples of polyfunctional (meth)acrylate applicable as the monomer (B) are neopentyl glycol di(meth)acrylate, ethylene glycol di(meth)acrylate, polyethylene glycol (repeating unit number (hereinafter referred to as "n") is 2 to 15) di(meth)acrylate, polypropylene glycol (n=2 to 15) di(meth)acrylate, polybutylene glycol (n=2 to 15) di(meth) acrylate, 2,2-bis(4-(meth)acryloxyethoxy phenyl) propane, 2,2-bis(4-(meth)acryloxydiethoxy phenyl) propane, trimethylolpropane diacrylate, bis(2-(meth)acryloxyethyl) hydroxyethyl isocyanurate, trimethylolpropane tri(meth) acrylate, tris(2-(meth)acryloxyethyl) isocyanurate, pentaerythritol tri(meth)acrylate, pentaerythritol tetra(meth) acrylate, dipentaerythritol tetra(meth)acrylate, dipentaerythritol penta(meth)acrylate, dipentaerythritol hexa(meth)acrylate, epoxy poly(meth)acrylate such as epoxy di(meth)acrylate formed by reacting bisphenol A diepoxy with (meth)acrylic acid, urethane poly(meth)acrylate such as urethane tri(meth)acrylate formed by reacting trimer of 1,6-hexamethylene diisocyanate with 2-hydroxy ethyl (meth)acrylate, urethane di(meth)acrylate formed by reacting isophorone diisocyanate with 2-hydroxy propyl (meth) arylate, urethane hexa(meth)acrylate formed by reacting isophorone diisocyanate with pentaerythritol tri(meth)acrylate, urethane di(meth)acrylate formed by reacting dicyclo methane diisocyanate with 2-hydroxy ethyl (meth)acrylate, or urethane di(meth)acrylate formed by reacting 2-hydroxy ethyl (meth)acrylate with an urethane reactant of dicyclo methane diisocyanate and poly(n=6 to 15) tetramethylene glycol, polyester (meth)acrylate formed by reacting trimethylolethane with succinic acid and (meth)acrylic acid, or polyester poly(meth)acrylate such as polyester (meth)acrylate formed by reacting trimethylol propane with succinic acid, ethylene glycol and (meth)acrylic acid.

Organic-inorganic hybrid (meth)acrylate obtained by condensing colloidal silica with, for instance, (meth)acryloyloxy alkoxysilane is also used for raising, for example, the hardness of the coating. Examples therefor are an organic-inorganic hybrid vinyl compound or an organic-inorganic hybrid (meth)acrylate compound containing a combination of, for instance, colloidal silica with any one selected from: vinyltrimethoxysilane, vinyltriethoxysilane, p-styryltrimethoxysilane, 3-(meth)acryloxy propyl methyldimethoxysilane, 3-(meth)acryloxy propyl trimethoxysilane, 2-(meth) acryloxy ethyl trimethoxysilane, 2-(meth)acryloxy ethyl triethoxysilane, 3-(meth)acryloxy propylmethyl diethoxysilane and 3-(meth)acryloxy propyl triethoxysilane.

Among the above compounds, in view of dynamics characteristics of the cured product after the curing with active energy or the like, the preferable compositions are monofunctional (meth)acrylate or polyfunctional (meth) acrylate having polymerizable unsaturated bond. Monofunctional (meth)acrylate is more preferable. Further, in view of the transparency of the obtained polymer, methyl methacrylate is particularly preferable.

The content of the monomer (B) in the monomer component is 65 to 99.99 mol %, more preferably 80 to 99.9 mol %. When the content of the monomer (B) is 65 mol % or more, the cured coating film has sufficient weather resistance and transparency. When the content of the monomer (B) is 99.99 mol % or less, the insufficient curing of the coating is suppressed. As the result, the toughness, heat resistance and wear resistance of the cured coating film are enhanced.

The monomer for the monomer (B) may be made of a single one of the above materials or a combination of two or more of the above materials.

Further, in view of the dynamics characteristics, transparency and weather resistance of the cured product after the curing, the monomer (B) preferably contains methyl methacrylate at the content of 50 mol % or more of the entire monomer (B), and the content is more preferably 60 to 100 mol %. When the content of methyl methacrylate is 60 mol % or more, the cured coating film has more sufficient weather resistance and transparency. When the content of methyl methacrylate is 99.9 mol % or less, the insufficient curing of the coating is further suppressed. As the result, the toughness, heat resistance and wear resistance of the cured coating film are further enhanced.

<Monomer (C)>

The curable composition according to the invention may further contain, in addition to the monomer (A) and the monomer (B), a polymer (C) containing a monomer (C) polymerizable with the monomer (A). The monomer (C) is a polymerizable monomer other than the monomer (A). The monomer (C) is not limited to a specific one as long as it is polymerizable with the monomer (A). The monomer (C) is preferably soluble in a mixture of the monomers (A) and (B). Examples of the monomer (C) are those materials enumerated in the description of the monomer (B). Among such materials, the monomer (C) preferably contains the methyl methacrylate units at the content of 50 mass % or more of the monomer (C).

The content of the polymer (C) is preferably 10 to 100 parts by mass when the monomer component is 100 parts by mass, more preferably 10 to 80 parts by mass.

The molecular weight of the polymer (C) is, but not limited thereto, preferably in the range of 10,000 to 1,000,000, more preferably 20,000 to 300,000 in terms of weight-average molecular weight (Mw) because the polymer (C) can be easily mixed and dissolved with the monomer.

The manufacturing method of the polymer (C) is not subject to any limitation. The polymer (C) is preferably manufactured by radical polymerization of the monomers. The monomers may be polymerized in the presence of solvent, or the monomers alone may be polymerized by mass polymerization.

When the polymer (C) is obtained by radical polymerization of the monomers containing at least the monomer (A), the polymerization temperature of the radical polymerization is preferably 210° C. or less. When the temperature is 210° C. or less, the HALS skeleton is stably incorporated into the cured product, and a transparent cured product is obtained.

<Radical Polymerization Initiator (D)>

The curable composition according to the invention may contain the radical polymerization initiator (D) as described above. The radical polymerization initiator (D), which may be suitably selected in view of the solubility of the initiator in the curable composition, is not subject to any limitation.

Concrete examples of the radical polymerization initiator (D) are preferably polymerization initiators activated by irradiation of active energy rays, and among them photo polymerization initiators are preferable. Examples of such radical polymerization initiator (D) are carbonyl compounds such as benzoin, benzoin monomethyl ether, benzoin isopropyl ether, acetoin, benzyl, benzophenone, p-methoxybenzophenone, diethoxyacetophenone, benzyl dimethyl ketal, 2,2-diethoxyacetophenone, 1-hydroxycyclohexyl phenyl ketone, methyl phenyl glyoxylate, and 2-hydroxy-2-methyl-1-phenylpropane-1-on; sulfur compounds such as tetramethyl thiuram monosulphide and tetramethyl thiuram disulphide; phosphorus compounds such as 2,4,6-trimethylbenzoil diphenylphosphine oxide, 2,4,6-trimethylbenzoil phenylethoxy phosphine oxide, bis(2,4,6-trimethyl benzoil)-phenyl phosphine oxide and bis(2,6-dimethoxy benzoil)-2,4,4-trimethyl-pentylphosphine oxide; 2-benzyl-2-dimethyl-amino-1-(4-morpholino phenyl) butanone-1; or camphorquinone. These inhibitors may be used alone or in combination of two or more of them. These photo polymerization initiators may be optionally combined according to the required film performance.

The content of the radical polymerization initiator (D) is preferably in the range of 0.1 to 10 parts by mass when the summed amount of the monomer (A) and the monomer (B) is 100 parts by mass, more preferably in the range of 0.2 to 6 parts by mass. When the content of the radical polymerization initiator (D) is 0.1 parts by mass or more, the curing speed of the coated cured product tends to be sufficiently increased. As the result, the obtained cured coating film tends to have excellent hardness (wear resistance) and weather resistance, and tends to be closely attached to the substrate. When the content of the radical polymerization initiator (D) is 10 parts by mass or less, the coloring of the cured coating film and the reduction in the weather resistance thereof are prevented.

<Ultraviolet Absorber (E)>

The curable composition according to the invention may contain an ultraviolet absorber (E). The ultraviolet absorber (E) is, but not limited thereto. The ultraviolet absorber (E) is preferably selected in the light of its uniform solubility ability of facilitating curing by active energy rays, and ability of providing the obtained cured product with the desired weather resistance. Ultraviolet absorbers particularly preferable for the ultraviolet absorber (E) are compounds: that are derived from materials based on benzophenone, benzotriazole, phenyl salicylate, phenyl benzoate or hydroxyphenyl triazine; and whose wavelength of maximum absorption is in the range of 240 to 380 nm. In particular, benzophenone-based ultraviolet absorbers, benzotriazole-based ultraviolet absorbers and hydroxyphenyl triazine-based ultraviolet absorbers are preferable for the ultraviolet absorber (E). Further, a combination of two or more of the above compounds in use is the most preferable.

Among the above compounds, preferably, concrete examples of the ultraviolet absorber (E) are 2-hydroxy-4-octoxybenzophenone and 2,4-dihydroxy benzophenone (i.e., benzophenone-based materials), 2-(2-hydroxy-tert-butylphenyl)benzotriazole (i.e., benzotriazole-based material), and 2-[4-(octyl-2-methylethanoate)oxy-2-hydroxyphenyl]-4,6-[bis(2,4-dimethylphenyl)]-1,3,5-triazine (i.e., hydroxyphenyl triazine-based material). A combination of two or more of the above in use is more preferable. The content of the ultraviolet absorber (E) is preferably 0.01 to 10 parts by mass when the summed amount of the monomer (A) and the monomer (B) is 100 parts by mass, more preferably 0.05 to 1 parts by mass. When the content of the ultraviolet absorber (E) is 2 parts by mass or more, the cured coating film has sufficient weather resistance. When the content of the ultraviolet absorber (E) is 30 parts by mass or less, the insufficient curing of the coating is further suppressed. Further, the hardness, heat resistance and wear resistance of the cured coating film are not reduced.

The curable composition preferably contains the above components (A), (B) and (D) as the primary components, and may further preferably contain the component (E).

If required, the curable composition may further contain a variety of additives such as organic solvent, antioxidant, yellow turning inhibitor, bluing agent, colorant, leveling agent, antifoaming agent, thickener, antisettling agent, antistatic agent, and surfactant. The antioxidant may be a phenol-based antioxidant such as IRGANOX 1010, IRGANOX 1076 or IRGANOX 1035 (each manufactured by BASF Ltd. (previously known as CIBA Limited)), sulfur-based antioxidant such as SUMILIZER TP-D (manufactured by Sumitomo Chemical Company, Limited) or Adekastab AO series (manufactured by ADEKA Corporation) or phosphorus-based antioxidant. The organic solvent is suitably selected according to the coating method. Specifically, when the curable composition is applied to spray coating, the organic solvent is preferably a suitable combination of alcohol-based solvent such as isobutanol, ester-based solvent such as n-butyl acetate, ketone-based solvent such as methyl isobutyl ketone and aromatic-based solvent such as toluene. Further, the active energy ray-curable composition (hereinafter also referred to as a coating material) preferably has a viscosity of 20 mPa·s or less. When the curable composition is used in coating such as shower flow coating or dip coating, the viscosity of the coating material is preferably set at 100 mPa·s or less. On the other hand, when the curable composition is used in a high-solid coating material having a solid content of more than 80 mass %, it is desired that the solvent for the curable composition be suitably selected in the view of the solubility of the additives such as ultraviolet absorbers.

<Polymerization>

Polymerization of the curable composition is not subject to any limitation. In polymerizing the curable composition, active energy ray is usable. Examples of the active energy ray are X-ray, ultraviolet and electron ray. The active energy ray is preferably ultraviolet.

Ultraviolet is irradiated by a variety of ultraviolet irradiators. Examples of the irradiating source are high-pressure mercury lamps, low-pressure mercury lamps, metal-halide lamps, Xenon lamps, chemical lamps, bacterical lamps, black lighting devices and ultraviolet LEDs.

The irradiation intensity of the active energy ray is suitably determined based on the relationship between the concentration of the polymerization initiator contained in the curable composition and dissolvable by active energy rays and the irradiation time. Further, in the above polymerizable liquid polymerizable with the active energy ray, the irradiation intensity is preferably in the range of 1 mW/cm$^2$ to 30 mw/cm$^2$, in view of the monomer growth speed. Too low irradiation intensity is not preferable. Specifically, when the irradiation intensity is too low, the polymerization initiator may not sufficiently dissolve, and the polymerization speed may be decreased. On the other hand, too high irradiation intensity is not preferable. Specifically, when the irradiation intensity is too high, no matter how much the initiator is increased, the monomer growth speed is not sufficiently increased in the polymerizable liquid polymerizable with active energy rays according to this method. Thus, much of the initiator is consumed in the termination reaction. When the irradiation intensity is too high, the reduction in the molecular amount of the product sheet and the excessive irradiation of active energy rays may cause the product to turn yellow.

The curable composition is polymerized into a cured coating film by irradiation with active energy rays after being applied to a substrate, a plastic product. Examples of the plastic are preferably a variety of thermoplastic resins and heat curing resins. These resins have been thus far demanded to, for instance, improve their weather resistance. Examples of the thermoplastic resins and heat curing resins are polymethyl methacryl resins, polycarbonate resins, polyester resins, poly(polyester) carbonate resins, polystylene resins, ABS resins, AS resins, polyamide resins, polyarylate resins, polymethacrylimide resins, polyallyl diglycol carbonate resins, polyolefin resins and amorphous polyolefin resins. In particular, polymethyl methacryl resins, polycarbonate resins, polystylene resins, polymethacrylimide resins and amorphous polyolefin resins are excellent in transparency, and improvement of the wear resistance in these resins has been strongly demanded. Accordingly, the coating composition according to the invention is effectively applicable to these resins in particular. When the coating material is cured with the irradiation of the active energy ray, the coating composition is applied to the substrate to have a predetermined thickness, and the solvent is thereafter volatilized. Then, using, for instance, a high pressure mercury lamp or metal-halide lamp, ultraviolet or electron ray is irradiated. The atmosphere under which the irradiation is conducted may be air atmosphere or may be atmosphere of inert gas such as nitrogen or argon.

The polymer obtained by polymerizing the curable compositions according to the invention may be added as a light stabilizer to a polymerizable composition intended to be used outdoor in particular. Such a polymerizable composition is mainly applicable to the exterior of automobile headlamp lenses and vehicle sensors. The exterior substrate of the headlamp lenses or the vehicle sensors are made of polycarbonate. Polycarbonate has high impact resistance, heat resistance, transparency and lightness. Therefore, polycarbonate is used as the material for headlamp lenses or vehicle sensors. However, polycarbonate may not have characteristics such as chemical resistance, weather resistance and excoriation resistance. Thus, polycarbonate is preferably applied with a coating material containing the polymer obtained by polymerizing the curable composition according to the invention. In other words, the polymerizable composition contains at least the polymer obtained by polymerizing the curable composition according to the invention and the polymerizable monomers.

The curable composition according to the invention is applicable as a coating material. Polycarbonate whose surface is applied with the coating material formed of the polymer obtained from the curable composition according to the invention has the characteristics comparative to glass, and is light in weight and easy to mold. Therefore, the polycarbonate whose surface is applied with the coating material is favorably applicable not only to automobile headlamp lenses and vehicle sensors but also in other fields. The polycarbonate whose surface is applied with the coating material is widely applicable to, for instance, outdoor signs, greenhouses, window glasses of outdoor buildings, roofs and balconies of terraces and garage and gauge covers.

Besides the above usage, the curable composition may be applied to a variety of resin sheets or resin films to have a predetermined thickness. After being applied thereto, the solvent is volatilized, and then irradiated by, for example, ultraviolet or electron rays using a high pressure mercury lamp or metal-halide lamp. The atmosphere under which the irradiation is conducted may be air atmosphere or may be atmosphere of inert gas such as nitrogen or argon.

The polymer obtained from the curable composition according to the invention is also applicable as resin sheets.

When the resin sheets are manufactured from the curable composition according to the invention, the content of the methyl methacrylate unit in the obtained polymer is preferably 50 mol % or more. In the above, the curable composition preferably uses polymethyl methacrylate as the polymer (C) described above, in view of the optical characteristics.

The polymer used according to the invention preferably has a weight-average molecular weight Mw of 30,000 to 500,000. When the polymer has the weight-average molecular weight of 30,000 or more, the heat resistance of the manufactured products is further enhanced. On the other hand, when the polymer has the weight-average molecular weight of 500,000 or less, the time for dissolving various components into the polymer during the preparation of the curable composition is shortened.

The curable composition preferably has a viscosity of 5000 mPa·s or more, more preferably 10000 mPa·s or more at 20° C. With this configuration, when the curable composition is fed to an endless belt, the curable composition is formed into products having a predetermined thickness. Alternatively, by covering either surface of the composition with a material having low rigidity (e.g., film), the surface of the composition has favorable outer appearance.

The method of feeding the curable composition to the endless belt is not subject to any limitation. Examples of the methods are a method to feed the composition through a typical piping or hose, and a variety of coating methods. The curable composition is fed to the endless belt and formed into continuous sheet. Accordingly, the curable composition is preferably fed by a feeding die to form a sheet shape. Examples of the method to form the curable composition into sheet shape are a method of feeding the curable composition via the feeding die as described above, and a method of spreading the curable composition fed to the endless belt using a roll and a roll mediated by the endless belt. In addition, the above methods may be combined to form the curable compositions into sheet shape.

The material of the belt in use is not limited to a specific one. The material may be freely selected (e.g., a metal or a resin), as long as the belt holds the curable composition. In order to manufacture the resin sheet in a continuous form, the belt is preferably an endless belt. Since the polymerization and curing of the composition involves polymerization shrinkage, the endless belt is more preferably a metal endless belt having high rigidity. In view of corrosion of the monomers, the endless belt is further preferably a stainless endless belt. The surface of the resin sheet transcribes the surface of the endless belt. Therefore, the endless belt is the most preferably a stainless endless belt whose surface is processed with mirror finishing.

The curable composition fed to the belt is covered with active energy ray-transmissive film.

The active energy ray-transmissive film in use is made of a transparent flexible synthetic resin film. The active energy ray-transmissive film is preferably made of film deformed at 100° C. or more to prevent the film from being deformed by heat during the polymerization. Examples of the film are film of synthetic resin such as polyethylene telephthalate, polyethylene naphthalate or polycarbonate. Among the above materials, polyethylene telephthalate film is preferably usable, in view of its high permeability of the active energy ray and its high surface texture. In view of the rigidity, the thickness of the film is preferably 10 μm or more, more preferably 50 μm or more. In view of the cost, the thickness is preferably 300 μm or less, more preferably 200 μm or less.

The surface of the active energy ray-transmissive film in contact with the active energy ray-curable composition is transcribed in the surface of the resin sheet obtained as the product. Therefore, the surface roughness (Ra) provided in JIS B0601 is preferably 100 nm or less, more preferably 10 nm or less.

The width of the active energy ray-transmissive film is set to be equal to or more than the width of the active energy ray-curable composition spread on the belt. The "width" herein means the length extending in the direction perpendicular to the direction in which the belt is transported.

The widthwise ends of the active energy ray-transmissive film are preferably both attached to the belt by adhesive tapes. With this configuration, the active energy ray-transmissive film serves similarly to a gasket. In other words, by closing the both ends of the active energy ray-transmissive film, the active energy ray-curable composition is prevented from leaking through the ends.

The adhesive tapes to be used are not subject to any limitations, as long as the adhesive tapes close the ends. The width of the adhesive tapes may be suitably determined. Examples of the material for the adhesive tapes are polyester-based resin such as PET, polyolefin-based resin such as polypropylene, polyimide-based resin, fluorine-based resin such as PTFE, cloth such as cotton cloth, staple fiber and non-woven textile fabrics, and aluminum foil. Examples of the adhesive for use in the adhesive tapes are acryl-based adhesive, silicone-based adhesive or rubber-based adhesive. The adhesive tapes may be one-sided adhesive tapes or double-sided adhesive tapes. When the ends are closed using one-sided adhesive tapes, such one-sided adhesive tapes are exemplarily attached as illustrated in FIG. 1. When the ends are closed using double-sided adhesive tapes, such double-sided adhesive tapes are exemplarily attached as illustrated in FIG. 2.

When one-sided adhesive tapes are utilized, the widthwise ends of the active energy ray-transmissive film each are preferably located at positions interior with respect to the widthwise ends of the belt, spaced apart respectively from the widthwise ends of the belt by 5 mm or more. With this configuration, the tapes are easily attached.

When the adhesive tapes are removed from the belt, the belt is preferably free from adhesive of the adhesive tapes. More preferably, the adhesive of the adhesive tapes does not remain on the belt when the adhesive tapes are removed from the belt after the adhesive tapes are heat-treated under the condition 1 described below. Further preferably, the adhesive of the adhesive tapes does not remain on the belt when the adhesive tapes are removed from the belt after the adhesive tapes are heat-treated under the condition 2 described below. With this configuration, contamination during the manufacturing process is prevented. Alternatively, the belt is prevented from having adhesive residual spots formed by repeatedly attaching the tapes to the belt.

Condition 1: heat treatment under the atmosphere of 100° C. for 20 minutes

Condition 2: heat treatment under the atmosphere of 150° C. for 10 minutes

Examples of the adhesive tapes that do not leave their adhesive on the belt after being heat-treated under the above condition 1 are No. 31B manufactured by Nitto Denko Corporation, No. 644 manufactured by Teraoka Seisakusho Co., Ltd., and No. 754 and No. 4734 manufactured by Sumitomo 3M Limited. Further, examples of the adhesive tapes that do not leave their adhesive on the belt after being heat-treated under the above condition 2 are No. 609 manufactured by Teraoka Seisakusho Co., Ltd., No. 923UL manufactured by Nitto Denko Corporation, and No. 5434 manufactured by Sumitomo 3M Limited.

The transportation speed of the belt is preferably 0.5 to 15 m/min, more preferably 1 to 10 m/min. Too low speed is not preferable. Specifically, when the speed is too low, the production amount of the resin sheet obtained as the products may be reduced. Too high speed is not preferable. Specifically, when the speed is too high, the section irradiated with the active energy ray for obtaining the time for polymerization may be increased.

The temperature condition during the curing may be suitably determined based on, for instance, the polymerization speed or the viscosity condition. However, the temperature when the active energy ray is irradiated is preferably the boiling point of the polymerizable monomer or less. For instance, when methyl methacrylate is used, the temperature is preferably 100° C. or less. In addition, it is known that when methyl methacrylate is contained, the lower the temperature during the polymerization is, the more the syndiotactic component is increased by the location of the bonds between the polymerizable monomer units in the polymer. The more the syndiotactic component is, the higher the glass transition temperature Tg of the polymer tends to be, which leads to higher heat resistance. Accordingly, the polymerization temperature when the active energy ray is irradiated is more preferably 50° C. or less. With this configuration, the heat resistance is enhanced.

The resin cured with the irradiation of the active energy ray may be further suitably subjected to a heat treatment at a temperature equal to or more than the glass transition temperature Tg obtained by the combination of the polymerizable monomer in use and the obtained polymer. With this configuration, the amount of the residue polymerizable monomers is reducible. When methyl methacrylate is used, the heat treatment is preferably conducted at 100° C. or more.

The thickness of the resin sheet is not specifically limited, but it is preferably 0.01 mm or more and 5 mm or less, more preferably 0.1 mm or more and 5 mm or less. When the thickness of the resin sheet is 5 mm or less, polymerization heat is easily eliminated. With this configuration, boiling of the non-polymerized monomers and the foaming within the resin sheets caused by such boiling are prevented. When the thickness of the resin sheet is 0.01 mm or more, the sheet is easily handled, and the advantageous effects of the invention are easily obtained.

The cured coating film or the resin sheet obtained from the curable composition according to the invention is excellent in transparency. The total light transmittance of the cured coating film or the resin sheet obtained by curing the curable composition is preferably 85 to 100%, more preferably 90 to 100%. The haze value thereof is preferably 5% or less, more preferably less than 5%. The cured coating film obtained from the curable composition according to the invention has reduced yellowness. The yellowness of the cured coating film is preferably 10 or less, more preferably 5 or less.

EXAMPLES

In the following description, the invention will be described further in details, by describing synthesis examples, examples and Comparative Examples. The invention is not specifically limited to such synthesis examples or examples.

In the following description, the formulation and number average molecular weight of the polymers synthesized in the synthesis examples, examples, and comparative examples were evaluated by the following method.

In the description of the examples, the "parts" and "%" respectively mean "parts by mass" and "mass %."

(1) Identification of Monomer (A)

Identification of the monomer (A) structure was conducted using 1H-NMR JNM-EX270 (a product name, manufactured by JEOL Ltd.).

The monomer (A) was dissolved in deuterated chloroform. The compound was identified based on the peak integrated intensity and the peak position. The measurement temperature was 25° C., and the cumulative number was 16.

(2) Polymerization Conversion

The polymerization conversion of the monomer component was identified using 1H-NMR JNM-EX270 (a product name, manufactured by JEOL Ltd.).

In the copolymerization of the monomer (A) and methyl methacrylate, the polymerization conversion was calculated based on the integral ratio between: the peak attributed to the hydrogen in the alkoxyl group originating from the monomer and the polymer; and the peak attributed to the hydrogen in the C—C double bonds originating from the monomer.

(3) Outer Appearance (Coloring)

By visually observing the product, whether or not the product was colored was determined.

(4) Weather Resistance Test

The product was cut into a size of 40 mm×40 mm. After the surface of the product was cleaned with neutral detergent, a weather resistance test was conducted using a Metal Weather KU-R5N-A (manufactured by Daipla Wintes Co., Ltd.) with an irradiation intensity of 80 mW/cm² at a temperature of 63° C. for 344 hours.

The total light transmittance and haze value of the product were measured using a Haze Meter HM-65 W Type (manufactured by Murakami Color Research Laboratory Co., Ltd.) according to the method described in JIS-K7105.

Yellowness was measured by measuring the transmission spectrums before and after the weather resistance test using a spectrophotometer MCPD-3000 (manufactured by Otsuka Electronics Co., Ltd.). The measured values were corrected according to the following formula, based on the thickness of the sample.

Yellowness(corrected value)=Yellowness(measured value)/Plate Thickness (mm)

In addition, a difference between the yellowness (corrected value) before the weather resistance test and the yellowness (corrected value) after the weather resistance test was obtained, and the difference was then used as the displacement of the yellowness.

Synthesis Example 1

Synthesis of 1-octyloxy-2,2,6,6-tetramethyl-4-methacryloyloxy piperidine (monomer (A-1))

A solution prepared by dissolving 30.3 g (330 mmol) of triethylamine and 34.4 g (200 mmol) of 4-hydroxy-2,2,6,6-tetramethyl piperidine-N-oxide (TEMPOL) in 200 ml of tetrahydrofuran (THF) was added with 25.5 g (250 mmol) of acetic anhydride at 0° C.

The solution was warmed up to 25° C. and left for reaction for 12 hours, and concentrated using a rotary evaporator. The residue was put into 1 litter of iced water. By filtering the precipitated orange solid, 33.8 g of 4-acetyloxy-2,2,6,6-tetramethyl piperidine-N-oxide was obtained.

In 200 ml of octane, 21.4 g (100 mmol) of 4-acetyloxy-2,2,6,6-tetramethyl piperidine-N-oxide was dissolved. Subsequently, 0.9 g (6 mmol) of molybdenum oxide (VI) was added to the resulting solution, and the solution was then dehydrated by heating under reflux. While the solution was being dehydrated by azeotropy, 19.2 g (150 mmol) of the 70% t-butyl hydroperoxide aqueous solution was dropped therein for 9 hours, and left so that reactions took place. Then, the solution was cooled to room temperature. Subsequently, by gradually adding 30 ml of saturated aqueous solution of sodium bisulphites thereto, non-reacted peroxides were deactivated. The organic layers were concentrated using a rotary evaporator. Then, the residue was dissolved in 100 ml of ethanol, added with 6.7 g (150 mmol) of potassium hydroxide, and left for reaction at 25° C. for 2 hours.

The mixture was concentrated using a rotary evaporator. Then, 200 ml of water was added to the residue, and extraction was conducted using 200 ml of dichloromethane in total. After the organic layers were concentrated using a rotary evaporator, the organic layers were dissolved in 20 ml of dichloromethane and 10 ml of triethylamine. The solution was added with 10.5 g (100 mmol) of methacryloyl chloride at 0° C., and left for reaction for 1 hour. The mixture was concentrated using a rotary evaporator. Then, 200 ml of water was added to the residue, and extraction was conducted using 200 ml of acetic ether in total. The organic layers were concentrated using a rotary evaporator. The residue was refined by column chromatography (silica gel, hexane/acetic ether=20/1 in volume ratio). With this operation, 26.3 g of colorless liquid was obtained (the yield was 74.4%).

By 1H-NMR measurement, the obtained product was identified as the monomer (A-1) represented by the formula (101) as follows.

1H-NMR (CDCl₃): δ (ppm): 0.89 (m, 6H), 1.17 (m, 10H), 1.18 (s, 6H), 1.21 (s, 6H), 1.61 (m, 2H), 1.85 (m, 2H), 1.92 (s, 3H), 3.60-3.93 (m, 1H), 5.07 (m, 1H), 5.53 (s, 1H), 6.03 (s, 1H)

[Chemical Formula 7]

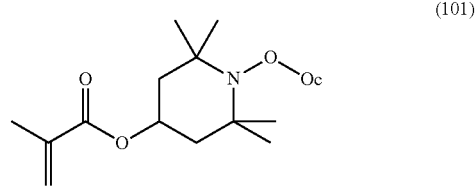

(101)

In the formula, Oc represents any one of the structures represented by the following formulae (I) to (III). In the following description, the structures represented by the following formulae (I) to (III) will be referred to as "Oc."

[Chemical Formula 8]

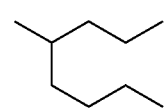

(I)

[Chemical Formula 9]

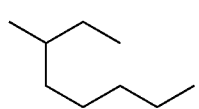

(II)

[Chemical Formula 10]

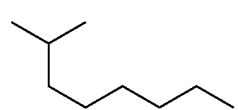

(III)

Synthesis Example 2

Synthesis of 1-propyloxy-2,2,6,6-tetramethyl-4-methacryloyloxy piperidine (monomer (A-2))

A solution prepared by dissolving 48.6 g (480 mmol) of triethylamine and 68.9 g (400 mmol) of 4-hydroxy-2,2,6,6-tetramethyl piperidine-N-oxide (TEMPOL) in 100 ml of dichloromethane was added with 47.8 g (440 mmol) of trimethylsilyl chloride at 0° C.

The solution was warmed up to 25° C. and left for reaction for 2 hours. Then, the solution was concentrated using a rotary evaporator. 500 ml of water was added to the residue, and extraction was conducted using 500 ml of acetic ether in total. The organic layers were concentrated using a rotary evaporator, and the residue was dissolved in hexane. By recrystallization, 96.2 g of 4-trimethylsilyloxy-2,2,6,6-tetramethyl piperidine-N-oxide was obtained.

4.6 g (190 mmol) of chipped magnesium, 100 ml of dehydrated THF and 10 mg of iodine were put into the reaction container. The atmosphere in the container was replaced with argon. Subsequently, 23.4 g (190 mmol) of 1-bromopropane was dropped into the container while the temperature within the container was kept at 55° C. to 65° C., and Grignard reactant was prepared.

In another reaction container, 96.2 g (394 mmol) of 4-trimethylsilyloxy-2,2,2,6-tetramethyl piperidine-N-oxide was dissolved in 100 ml of dehydrated THF. The prepared Grignard reactant was dropped thereinto at 0° C. After being left for reaction for 3 hours, the solution was concentrated using a rotary evaporator. 500 ml of water was added to the residue, and extraction was conducted using 500 ml of acetic ether in total. The organic layers were concentrated using a rotary evaporator. The residue was refined by column chromatography (silica gel, hexane/acetic ether=20/1 in volume ratio), and 38.5 g of 1-(1-propyl)oxy-2,2,6,6-tetramethyl-4-trimethylsilyloxy piperidine was obtained.

38.5 g of 1-(1-propyl)oxy-2,2,6,6-tetramethyl-4-trimethylsilyloxy piperidine was dissolved in 300 ml of methanol. The solution was added with 0.14 g (0.1 mmol) of potassium carbonate and left for reaction for 3 hours. Then, the solution was concentrated using a rotary evaporator. 300 ml of water was added to the residue, and extraction was conducted using 300 ml of acetic ether in total. The organic layers were concentrated using a rotary evaporator. The residue was dissolved in 20 ml of dichloromethane and 20 ml of triethylamine. The solution was added with 14.1 g (135 mmol) of methacryloyl chloride at 0° C. After the solution was left for reaction for 1 hour, the precipitated triethylamine hydrochloride was filtered. The solution was concentrated using a rotary evaporator. The residue was refined by column chromatography (silica gel, hexane/acetic ether=20/1 in volume ratio), and 29.7 g of colorless liquid was obtained (the yield was 26.2%).

By 1H-NMR measurement, the obtained product was identified as the monomer (A-2) represented by the formula (102) as follows.

1H-NMR (CDCl$_3$): δ (ppm): 0.94 (t, 3H), 1.21 (s, 12H), 1.53 (m, 2H), 1.61 (m, 2H), 1.86 (m, 2H), 1.92 (s, 3H), 3.70 (t, 2H), 5.07 (m, 1H), 5.53 (s, 1H), 6.06 (s, 1H)

[Chemical Formula 11]

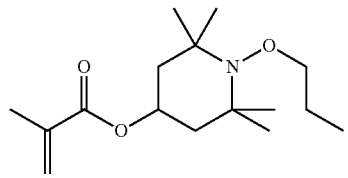

(102)

Synthesis Example 3

Synthesis of 1-octyloxy-2,2,6,6-tetramethyl-4-(2-(2-methacryloyloxy) ethoxy) ethoxy piperidine (monomer (A-3))

17.8 g (100 mmol) of 2,2,6,6-tetramethyl-4-hydroxy piperidine-N-oxide was dissolved in 100 ml of acetone. 34 g (300 mmol) of 30% hydrogen peroxide aqueous solution was slowly added thereto for 10 minutes or more. While the solution was cooled to 5° C., 0.49 g (5.0 mol %) of copper chloride (I) was added thereto. The temperature of the reaction mixture was kept at 5° C. to 55° C. In 15 minutes later, 0.5 g of 35% acidum hydrochloricum was added thereto, and the reaction mixture was stirred for 2 hours at the room temperature. In 2 hours later, the reaction mixture was added with 50 ml of sodium bisulfite aqueous solution (4 mol/L) and 100 ml of saturated aqueous solution of potassium bicarbonate, and extraction was conducted using 300 ml of acetic ether. By concentrating the organic layers using a rotary evaporator, 1-methyloxy-2,2,6,6-tetramethyl-4-hydroxy piperidine was obtained.

The obtained 1-methyloxy-2,2,6,6-tetramethyl-4-hydroxy piperidine was dissolved in 50 ml of dichloromethane and 50 ml of triethylamine. The solution was slowly added with 10.4 g (100 mmol) of methacryloyl chloride at 0° C. The solution was gradually warmed up to the room temperature and left for reaction for 1 hour. In 1 hour later, the reaction mixture was concentrated using a rotary evaporator. 300 ml of water was added to the residue, and extraction was conducted using 300 ml of acetic ether. The organic layers were concentrated using a rotary evaporator. The residue was refined by column chromatography (silica gel, hexane/acetic ether=10/1 in volume ratio), and 19.0 g of colorless liquid was obtained (the yield was 74.3%).

By 1H-NMR measurement, the obtained product was identified as the monomer (A-3) represented by the formula (103) as follows.

1H-NMR(CDCl$_3$): δ (ppm): 0.89 (m, 6H), 1.15 (s, 6H), 1.18 (s, 6H), 1.29 (m, 10H), 1.30-1.41 (m, 2H), 1.59-1.82 (m, 2H), 1.95 (s, 3H), 2.62 (m, 4H), 3.73 (m, 1H), 4.35 (s, 4H), 5.02 (m, 1H), 5.60 (s, 1H), 6.13 (s, 1H)

[Chemical Formula 12]

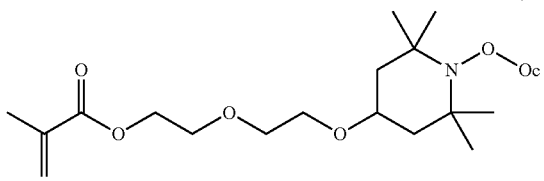

(103)

Synthesis Example 4

Synthesis of 1-octyloxy-2,2,6,6-tetramethyl-4-(4-(2-methacryloyloxy) ethoxy-1,4-dioxo) butoxy piperidine (monomer (A-4))

A solution prepared by dissolving 20.2 g (200 mmol) of triethylamine and 26.0 g (100 mmol) of 2,2,6,6-tetramethyl-4-(2-(2-hydroxy) ethoxy) ethoxy piperidine in 100 ml of THF was added with 12.3 g (120 mmol) of acetic anhydride at 0° C.

The solution was warmed up to 25° C. and left for reaction for 12 hours. Then, the solution was concentrated using a rotary evaporator. 500 ml of water was added to the residue, and extraction was conducted using 500 ml of acetic ether in total. The organic layers were concentrated using a rotary evaporator. The residue was refined by column chromatography (silica gel, hexane/acetic ether=1/1 in volume ratio), and 5.6 g (22 mmol) of 2,2,6,6-tetramethyl-4-(2-(2-acetyloxy) ethoxy) ethoxy piperidine was obtained.

In 100 ml of octane, 3.0 g (10 mmol) of 2,2,6,6-tetramethyl-4-(2-(2-acetyloxy) ethoxy) ethoxy piperidine was dissolved. After being added with 0.07 g (0.5 mmol) of molybdenum oxide (VI), the solution was dehydrated by heating under reflux. While the solution was being dehydrated by azeotropy, 12.8 g (100 mmol) of the 70% t-butyl hydroperoxide aqueous solution was dropped therein for 6 hours, left so that reactions took place. Then, the solution was cooled to the room temperature. Subsequently, by gradually adding 20 ml of saturated aqueous solution of sodium bisulphites thereto, non-reacted peroxides were deactivated. The organic layers were concentrated using a rotary evaporator. Then, the residue was dissolved in 15 ml of ethanol. The solution was added with 0.6 g (15 mmol) of sodium hydroxide, and left for reaction for 2 hours at 25° C.

The mixture was concentrated using a rotary evaporator. 100 ml of water was added to the residue, and extraction was conducted using 100 ml of dichloromethane in total. The organic layers were concentrated using a rotary evaporator. Then, the organic layers were dissolved in 10 ml of triethylamine, and the solution was added with 1.1 g (10 mmol) of methacryloyl chloride at 0° C., and left for reaction for 1 hour. The mixture was concentrated using a rotary evaporator. 50 ml of water was added to the residue, and extraction was conducted using 50 ml of acetic ether in total. The organic layers were concentrated using a rotary evaporator. The residue was refined by column chromatography (silica gel, hexane/acetic ether=3/1 in volume ratio), and 1.9 g (3.1 mmol) of colorless liquid was obtained (the yield was 3.1%).

By 1H-NMR measurement, the obtained product was identified as the vinyl monomer (A-4) represented by the formula (104) as follows.

1H-NMR(CDCl$_3$): δ (ppm): 0.89 (m, 6H), 1.14 (s, 12H), 1.28 (m, 10H), 1.35-1.47 (m, 2H), 1.63-1.84 (m, 2H), 1.95 (s, 3H), 3.54-3.87 (m, 2H), 3.61 (m, 4H), 3.75 (t, 2H), 4.30 (t, 2H), 5.57 (s, 1H), 6.14 (s, 1H)

[Chemical Formula 13]

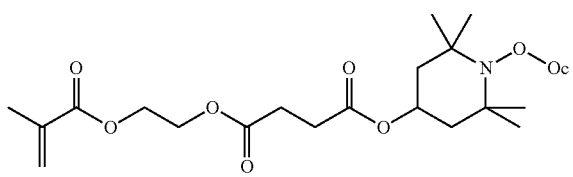

(104)

Synthesis Example 5

Synthesis of 1-methyloxy-2,2,6,6-tetramethyl-4-methacryloyloxy piperidine (monomer (A-5))

In 100 ml of octane, 6.4 g (30 mmol) of 4-acetyloxy-2,2,6,6-tetramethyl piperidine-N-oxide, which was synthesized according to the method described in Synthesis Example 1 above, was dissolved. After being added with 0.1 g (0.7 mmol) of molybdenum oxide (VI), the solution was dehydrated by heating under reflux. While the solution was being dehydrated by azeotropy, 12.8 g (100 mmol) of the 70% t-butyl hydroperoxide aqueous solution was dropped therein for 6 hours, left so that reactions took place. Then, the solution was cooled to the room temperature. Subsequently, by gradually adding 50 ml of saturated aqueous solution of sodium bisulphites thereto, non-reacted peroxides were deactivated. The organic layers were concentrated using a rotary evaporator. Then, the residue was dissolved in 50 ml of ethanol. The solution was added with 2.8 g (50 mmol) of sodium hydroxide, and left for reaction for 4 hours at 25° C.

The mixture was concentrated using a rotary evaporator. 100 ml of water was added to the residue, and extraction was conducted using 100 ml of dichloromethane in total. The organic layers were concentrated using a rotary evaporator. The residue was added with 20 ml of tetrahydrofuran, 4.0 g (40 mmol) of triethylamine and 3.0 g (30 mmol) of succinic anhydride. The solution was stirred continuously for 4 hours at 70° C. In 4 hours later, the solution was concentrated using a rotary evaporator. 100 ml of saturated aqueous solution of ammonium chloride was added to the residue, and extraction was conducted using 100 ml of acetic ether in total.

The organic layers were concentrated using a rotary evaporator. The residue was added with 3.9 g (30 mmol) of 2-hydroxyethyl methacrylate, 0.24 g (2 mmol) of N,N'-dimethyl-4-aminopyridine and 5 ml of dichloromethane. A solution prepared by dissolving 6.2 g (30 mmol) of N,N'-dicyclohexylcarbodiimide in 20 ml of dichloromethane was dropped thereinto at 0° C., and left for reaction for 4 hours. In 4 hours later, the precipitated solid was filtered. The filtrate was concentrated using a rotary evaporator. The residue was refined by column chromatography (silica gel, hexane/acetic ether=5/1 in volume ratio), and 5.58 g of colorless liquid was obtained (the yield was 56.1%).

By 1H-NMR measurement, the obtained product was identified as the vinyl monomer (A-5) represented by the formula (105) as follows.

1H-NMR (CDCl$_3$): δ (ppm): 1.19 (s, 6H), 1.23 (s, 6H), 1.60 (m, 2H), 1.87 (m, 2H), 1.92 (s, 3H), 3.62 (s, 3H), 5.07 (m, 1H), 5.53 (s, 1H), 6.06 (s, 1H)

[Chemical Formula 14]

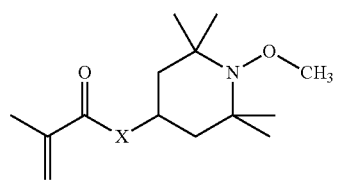

(105)

Example 1

A monomer component was prepared by mixing 60 parts of methyl methacrylate (MMA) with 0.35 parts of the monomer (A-1). The resulting monomer component (100 mol %) contained 0.10 mol % of the monomer (A-1).

To the monomer component, 0.30 parts of 1-hydroxycyclohexyl-phenyl ketone (IRGACURE 184 manufactured by Ciba Specialty Chemicals Inc.) as a polymerization initiator and 0.05 parts of di(2-ethylhexyl) sodium sulfosuccinate (AEROSOL OT-100 manufactured by Mitsui Cyanamid Ltd.) as a release agent were added. The resulting mixture was then dissolved at normal temperature. Subsequently, 40 parts of polymethylmethacrylate (BR-83 manufactured by Mitsubishi Rayon Co., Ltd., 40,000 in weight-average molecular weight) was heat-melted at 80° C. for 30 minutes to give the active energy ray-curable composition (1). Subsequently, the resulting composition (1) was left at 50° C. for 2 hours, and naturally cooled to normal temperature.

Using apparatus similar to that the apparatus illustrated in FIG. 1, resin sheets were manufactured. A stainless endless belt having a width of 500 mm was used as an endless belt 3. A ultraviolet transmissive film 5 was a polyethylene terephthalate film of 450 mm in width and 188 μm in thickness (COSMOSHINE A4100 manufactured by Toyobo Co., Ltd.). A ultraviolet irradiator 4 was an FL30S-BL Lamp (product name) manufactured by Toshiba Corporation. A pre-heating mechanism 9 and a post-heating mechanism 10 were hot-air heaters, respectively.

The transportation speed of the endless belt 3 was set at 1.5 m/min. The active energy ray-curable composition (1) was fed from a feeding die 1 so that the composition (1) formed a sheet of 400 mm in width and 1 mm in thickness. The ultraviolet transmissive film 5 was covered thereon. Then, with the pre-heating mechanism, the composition was controlled to be 60° C. before being irradiated with the ultraviolet. Using the ultraviolet irradiator 4, ultraviolet was irradiated thereto for 10 minutes at an irradiation intensity of 5 mW/cm$^2$. The composition was then heat treated by the post-heating mechanism 10 for 5 minutes at 130° C. Thereafter, the composition was air-cooled to 90° C., and the resin sheet was removed from the ultraviolet transmissive film 5 and the endless belt 3.

The upper and lower surfaces of the obtained transparent resin sheet (product (1)) were flat and smooth, and the product had good outer appearance. The obtained transparent resin sheet had a slightly reduced thickness at its edges, due to flux before the irradiation of ultraviolet or the like.

The polymer conversion, outer appearance and yellowness (due to the weather resistance test) of the product (1) are shown in Table 1.

Examples 2 to 5

Products (2) to (5) were obtained through the same operations as in Example 1 except that the types and amounts of the monomer (A) were changed to those shown in Table 1. The polymer conversion, outer appearance and yellowness (due to the weather resistance test) of the products (2) to (5) are shown in Table 1.

Comparative Examples 1 to 4

Products (6) to (9) were obtained through the same operations as in Example 1 except that: the monomer (A-1) was not used. The HALS shown in Table 2 was used in the amount as shown in Table 2). The polymer conversion, outer appearance and yellowness (due to the weather resistance test) of the products (6) to (9) are shown in Table 2.

Comparative Example 5

A product (10) was obtained through the same operations as in Example 1 (except that the monomer (A-1) was not used). The polymer conversion, outer appearance and yellowness (due to the weather resistance test) of the product (10) are shown in Table 2.

TABLE 1

| | | Monomer | | | | Outer | Total Light Transmittance [%] | | Haze (%) | | Yellowness (corrected) Weather Resistance Test | | |
|---|---|---|---|---|---|---|---|---|---|---|---|---|---|
| | Product | MMA [parts] | (A) | [parts] | [mol %] | Conversion [%] | Appearance [color] | before test | after test | before test | after test | before test | after test | displacement |
| Example 1 | 1 | 60 | A-1 | 0.35 | 0.10 | 99.3 | colorless | 92.2 | 91.8 | 0.35 | 0.39 | 0.22 | 1.02 | 0.80 |
| Example 2 | 2 | 60 | A-2 | 0.28 | 0.10 | 99.2 | colorless | 92.1 | 91.2 | 0.26 | 0.41 | 0.22 | 1.15 | 0.93 |
| Example 3 | 3 | 60 | A-3 | 0.21 | 0.10 | 99.4 | colorless | 92.2 | 91.8 | 0.59 | 0.65 | 0.20 | 1.19 | 0.99 |
| Example 4 | 4 | 60 | A-4 | 0.46 | 0.10 | 99.1 | colorless | 91.8 | 91.9 | 0.29 | 0.42 | 0.21 | 1.18 | 0.97 |
| Example 5 | 5 | 60 | A-5 | 0.49 | 0.10 | 99.2 | colorless | 91.8 | — | 0.48 | — | 0.24 | — | — |

TABLE 2

| | Product | MMA [parts] | HALS | [parts] | [mol %] | Conversion [%] | Outer Appearance [color] | Total Light Transmittance [%] | | Haze (%) | | Yellowness (corrected) Weather Resistance Test | | |
|---|---|---|---|---|---|---|---|---|---|---|---|---|---|---|
| | | | | | | | | before test | after test | before test | after test | before test | after test | displacement |
| Comparative Example 1 | 6 | 60 | LA-87 | 0.23 | 0.10 | 99.3 | colorless | 91.9 | 90.2 | 0.52 | 0.96 | 0.23 | 1.43 | 1.20 |
| Comparative Example 2 | 7 | 60 | LA-82 | 0.24 | 0.10 | 99.3 | colorless | 92.1 | 91.6 | 0.48 | 1.01 | 0.23 | 1.36 | 1.13 |

TABLE 2-continued

| | Product | MMA [parts] | HALS [parts] | | [mol %] | Conversion [%] | Outer Appearance [color] | Total Light Transmittance [%] | | Haze (%) | | Yellowness (corrected) Weather Resistance Test | | |
|---|---|---|---|---|---|---|---|---|---|---|---|---|---|---|
| | | | | | | | | before test | after test | before test | after test | before test | after test | dis-placement |
| Comparative Example 3 | 8 | 60 | LS770 | 0.24 | 0.05* | 99.3 | colorless | 92.3 | 91.2 | 0.48 | 1.03 | 0.21 | 1.47 | 1.26 |
| Comparative Example 4 | 9 | 60 | TV-292 | 0.25 | 0.05* | 99.3 | colorless | 92.0 | 91.8 | 0.65 | 1.02 | 0.23 | 1.33 | 1.10 |
| Comparative Example 5 | 10 | 60 | — | — | — | 99.3 | colorless | 92.4 | 91.6 | 0.32 | 0.89 | 0.23 | 1.58 | 1.35 |

ABBREVIATION IN TABLES

LA-87: 2,2,6,6-tetramethyl-4-methacryloyloxy piperidine (LA-87 manufactured by ADEKA Corporation)

LA-82: 1,2,2,6-pentamethyl-4-methacryloyloxy piperidine (LA-82 manufactured by ADEKA Corporation)

LS770: bis(2,2,6,6-tetramethyl-4-piperidyl) sebacate (manufactured by ADEKA Corporation)

TV-292: bis(1,2,2,6,6-pentamethyl-4-piperidyl) sebacate (TV-292 manufactured by Ciba Japan K.K.)

LS 770 and TV-292 have hindered amine structures with piperidine skeletons in their molecules (hereinafter referred to as "HALS portions"). Thus, they were added as HALS portions in amount of 0.10 mol %.

As is clear from Table 1, the product (Examples 1 to 5) obtained from the manufacturing method according to the invention had small yellowness displacement and favorable weather resistance. Comparative Examples 1 to 5, which contained no monomer (A), had great yellowness displacement and inferior weather resistance.

Next, cured coating films obtained from the manufacturing method according to the invention will be described with reference to examples and Comparative Examples, through which the invention will be described in further detail. The invention is not limited by such synthesis examples and examples.

Examples 6 to 15, Comparative Examples 6 to 10

Method of Forming Cured Coating Film Test Piece

Polycarbonate resin plates of 3 mm in thickness (product name "Lexan LS-2" manufactured by General Electric Company) were coated with the curable compositions composed as in Tables 3 and 4 by bar coating to give a cured coating film of 8 μm in thickness. The coated plates were heated in a heating furnace of 60° C. for 90 seconds, and the organic solvents were volatilized. Then, using a high-pressure mercury lamp in the air, energy having a wavelength of 340 to 380 nm and a light integral of 3000 mJ/cm² was irradiated to cure the curable compositions. In this manner, products 11 to 25 in the form of the cured coating film were obtained.

<Weather Resistance Test of Cured Coating Film>

The method of the weather resistance test of the cured coating film was as described below. Using a Sunshine Carbon Weather Meter (WEL-SUN-HC-B type weather resistance tester manufactured by Suga Test Instruments Co., Ltd.), the cured coating film on the test pieces was tested. The black panel temperature of the weather resistance tester is 63±3° C. Changes of the cured coating film after exposed to cycles of rainfall of 12 minutes and irradiation of 48 minutes for 3500 hours were observed in the following manner.

<Evaluation Method of Samples Before and After Weather Resistance Test>

(1) Outer Appearance

The outer appearance of the test pieces after the weather test was visually evaluated. The test samples whose surfaces were free from cracks and natural separation were rated as "G." The test samples whose surfaces had cracks or natural separation were rated as "NG."

(2) Measurement of Transparency of Test Sample

The total light transmittance and haze value of the test pieces were measured using a Haze Meter HM-65 W Type (manufactured by Murakami Color Research Laboratory Co., Ltd.) according to the method described in JIS-K7105. When the measured haze value after the weather resistance test was 0% or more and less than 5%, such test pieces were rated as good (1). When the haze value was 5% or more and less than 10%, such test pieces were rated as medium (2). When the haze value was 10% or more, such test pieces were rated as bad (3).

(3) Measurement of Yellowness (Yellow Index) of Test Sample

Yellowness (yellow index) of the test pieces were measured using a Multi Channel Photo Detector MCPD-3000 (manufactured by Otsuka Electronics Co., Ltd.) according to the method described in JIS-K7105. When the measured yellow index value after the weather resistance test was 0 or more and less than 5, such test pieces were rated as good (1). When the yellow index value was 5 or more and less than 10, such test pieces were rated as medium (2). When the yellow index was 10 or more, such test pieces were rated as bad (3).

Table 3 shows the compositions of the active energy ray-curable compositions according to Examples 6 to 15. Table 4 shows the compositions of the active energy ray-curable compositions according to Comparative Examples 6 to 10. The results of the weather resistance test conducted on the prepared compositions are also shown. The numeric values in Tables 3 and 4 are represented in parts by mass.

TABLE 3

| | Product | Monomer (A) | [parts] | DPHA [parts] | TAIC [parts] | UA1 [parts] | BNP [parts] | MPG [parts] | MAPO [parts] | HBPB [parts] |
|---|---|---|---|---|---|---|---|---|---|---|
| Example 6 | 11 | A-1 | 1 | 33 | 40 | 27 | 1 | 1 | 1 | 10 |
| Example 7 | 12 | A-2 | 1 | 33 | 40 | 27 | 1 | 1 | 1 | 10 |
| Example 8 | 13 | A-3 | 1 | 33 | 40 | 27 | 1 | 1 | 1 | 10 |
| Example 9 | 14 | A-4 | 1 | 33 | 40 | 27 | 1 | 1 | 1 | 10 |
| Example 10 | 15 | A-5 | 1 | 33 | 40 | 27 | 1 | 1 | 1 | 10 |
| Example 11 | 16 | A-1 | 2 | 33 | 40 | 27 | 1 | 1 | 1 | 10 |
| Example 12 | 17 | A-2 | 2 | 33 | 40 | 27 | 1 | 1 | 1 | 10 |
| Example 13 | 18 | A-3 | 2 | 33 | 40 | 27 | 1 | 1 | 1 | 10 |
| Example 14 | 19 | A-4 | 2 | 33 | 40 | 27 | 1 | 1 | 1 | 10 |
| Example 15 | 20 | A-5 | 2 | 33 | 40 | 27 | 1 | 1 | 1 | 10 |

| | Solvent | | Outer Appearance | Results of Weather Resistance Test | | | | | | | |
|---|---|---|---|---|---|---|---|---|---|---|---|
| | n-butyl acetate [parts] | ECA [parts] | | Total Light Transmittance (%) | | Haze (%) | | | Yellowness | | |
| | | | | before test | after test | before test | after test | Rating | before test | after test | Rating |
| Example 6 | 15 | 13 | G | 89.1 | 87.2 | 1.3 | 1.4 | 1 | 1.2 | 1.5 | 1 |
| Example 7 | 15 | 13 | G | 88.9 | 86.9 | 1.1 | 1.5 | 1 | 1.2 | 1.8 | 1 |
| Example 8 | 15 | 13 | G | 89.6 | 87.9 | 0.9 | 1.3 | 1 | 1.1 | 1.3 | 1 |
| Example 9 | 15 | 13 | G | 88.9 | 87.1 | 1.1 | 1.3 | 1 | 1.2 | 1.3 | 1 |
| Example 10 | 15 | 13 | G | 90.0 | 86.9 | 1.0 | 1.2 | 1 | 1.3 | 1.6 | 1 |
| Example 11 | 15 | 13 | G | 89.2 | 88.3 | 1.0 | 1.3 | 1 | 1.4 | 1.8 | 1 |
| Example 12 | 15 | 13 | G | 90.1 | 88.6 | 0.9 | 1.6 | 1 | 1.3 | 1.4 | 1 |
| Example 13 | 15 | 13 | G | 88.9 | 88.1 | 0.8 | 1.9 | 1 | 1.5 | 1.8 | 1 |
| Example 14 | 15 | 13 | G | 89.8 | 88.8 | 0.8 | 1.8 | 1 | 1.8 | 2.0 | 1 |
| Example 15 | 15 | 13 | G | 90.2 | 87.9 | 1.3 | 2.0 | 1 | 1.7 | 2.1 | 1 |

TABLE 4

| | Product | Monomer (A) | [parts] | DPHA [parts] | TAIC [parts] | UA1 [parts] | BNP [parts] | MPG [parts] | MAPO [parts] | HBPB [parts] |
|---|---|---|---|---|---|---|---|---|---|---|
| Comparative Example 6 | 21 | LS-292 | 1 | 33 | 40 | 27 | 1 | 1 | 1 | 10 |
| Comparative Example 7 | 22 | T-152 | 1 | 33 | 40 | 27 | 1 | 1 | 1 | 10 |
| Comparative Example 8 | 23 | LS-3410 | 1 | 33 | 40 | 27 | 1 | 1 | 1 | 10 |
| Comparative Example 9 | 24 | PR-31 | 1 | 33 | 40 | 27 | 1 | 1 | 1 | 10 |
| Comparative Example 10 | 25 | — | — | 33 | 40 | 27 | 1 | 1 | 1 | 10 |

| | Solvent | | Outer Appearance | Results of Weather Resistance Test | | | | | | | |
|---|---|---|---|---|---|---|---|---|---|---|---|
| | n-butyl acetate [parts] | ECA [parts] | | Total Light Transmittance (%) | | Haze (%) | | | Yellowness | | |
| | | | | before test | after test | before test | after test | Rating | before test | after test | Rating |
| Comparative Example 6 | 15 | 13 | G | 89.2 | 87.2 | 3.2 | 12.3 | 3 | 1.8 | 6.9 | 2 |
| Comparative Example 7 | 15 | 13 | G | 90.2 | 86.9 | 1.0 | 8.6 | 2 | 1.5 | 3.5 | 1 |
| Comparative Example 8 | 15 | 13 | G | 88.6 | 86.5 | 1.9 | 12.1 | 3 | 1.6 | 3.8 | 1 |
| Comparative Example 9 | 15 | 13 | G | 89.5 | 85.9 | 2.1 | 6.9 | 2 | 1.6 | 2.9 | 1 |
| Comparative Example 10 | 15 | 13 | G | 88.9 | 86.9 | 2.3 | 10.8 | 3 | 1.8 | 2.8 | 1 |

In Tables 3 and 4, the following signs represent the following compounds.

DPHA: di-pentaerythritol hexaacrylate

UA1: urethane acrylate having a molecular weight of 2500 and synthesized from 2 mol of dicyclohexyl methanediol, 1 mol of nonabutylene glycol and 2 mol of 2-hydroxyethyl acrylate TAIC: tris(2-acryloyloxyethyl)isocyanurate HBPB: 2-(2-hydroxy-5-tert-butylphenyl)benzotriazole BNP: benzophenone MPG: methyl phenylglyoxylate MAPO: 2,4,6-trimethylbenzoyl diphenyl phosphine oxide ECA: ethyl diglycol acetate LS-292: Product name "Sanol LS-292" manufactured by Sankyo Kasei Co., Ltd. (a mixture of his (1,2,2,6,6-pentamethyl-4-piperidyl) sebacate and methyl (1,2,2,6,6-pentamethyl-4-piperidyl) sebacate)

T-152: Product name "TINUVIN 152" manufactured by Ciba Specialty Chemicals Inc. (2,4-bis [N-butyl-N-(1-cyclohexyloxy-2,2,6,6-tetramethyl piperidine-4-yl)amino]-6-(2-hydroxyethylamine)-1,3,5-triazin)

LS-3410: Product name "Sanol LS-3410" manufactured by Sankyo Kasei Co., Ltd. (N-methyl-2,2,6,6-tetramethyl piperidyl methacrylate) PR-31: Product name "SANDUVOR PR-31" manufactured by Clariant (Japan) K.K. (propanedioic acid [{4-methoxyphenyl}methylene]-bis(1,2,2,6,6-pentamethyl-4-piperidyl) ester)

In the cured coating film according to Examples 6 to 15, the monomer (A) was used. Accordingly, the cured coating film according to Examples 6 to 15 had good outer experience, good transparency, and yellowness after the weather resistance test.

In the cured coating film according to Comparative Examples 6 to 10, only a known light stabilizer (i.e., other than the monomer (A)) was used, or no HALS portion was included. Therefore, in the cured coating film according to Comparative Examples 6 to 10, either haze value after the weather resistance test after the weather resistance test or the yellowness was not good.

REFERENCE SIGNS LIST

1 Feeding die
2 Curable composition
2' Transparent resin sheet
3 Endless belt
4 Active energy ray irradiator
5 Active energy ray-transmissive film
6 Active energy ray-transmissive film feeding device
7 Active energy ray-transmissive film winding device
8 Upper-side pressing roll
8' Lower-side pressing roll
9 Pre-heating mechanism
10 Post-heating mechanism
11 Main pulley
12 Main pulley

The invention claimed is:

1. An active energy ray curable composition, comprising:
   a monomer component comprising a monomer (A) of formula (1) and a monomer (B) polymerizable with the monomer (A),
   wherein
   a content of the monomer (A) is from 0.01 to 35 mol % based on a total amount of the monomer component, and
   a content of the monomer (B) is from 65 to 99.99 mol % based on the total amount of the monomer component,

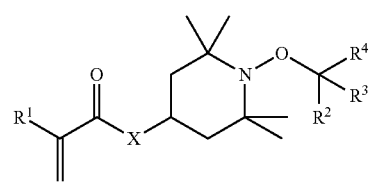

wherein
$R^1$ is a hydrogen atom or a methyl group;
X is an imino group, a structure of formula (2) or a structure of formula (3);
$R^2$, $R^3$ and $R^4$ each independently are a hydrogen atom, a linear alkyl group comprising from 1 to 8 carbon atoms, a branched linear alkyl group comprising from 1 to 8 carbon atoms, a substituted or an unsubstituted cycloalkyl group comprising from 6 to 8 carbon atoms, or a substituted or an unsubstituted aryl group comprising from 6 to 12 carbon atoms; and
a combination of $R^2$ and $R^3$, $R^2$ and $R^4$, $R^3$ and $R^4$, or $R^2$, $R^3$ and $R^4$ optionally form a ring structure and the ring structure optionally has a substituted group,

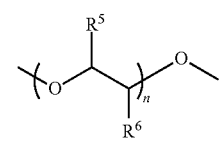

wherein
n is an integer of from 1 to 10;
$R^5$ and $R^6$ each are a hydrogen atom or a methyl group; and
at least one of $R^5$ and $R^6$ is a hydrogen atom,

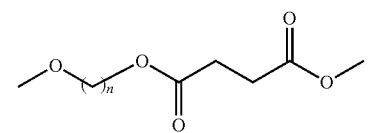

wherein n is an integer of from 1 to 10.

2. The active energy ray curable composition according to claim 1, further comprising a polymer comprising a monomer (C) polymerizable with the monomer (A).

3. The active energy ray curable composition according to claim 1, wherein the monomer (B) comprises methyl methacrylate at a content of 50 mol % or more.

4. A method of manufacturing a polymer, comprising:
   polymerizing the curable composition according to claim 1 with irradiation of active energy ray.

5. A method of manufacturing a polymer, comprising:
   polymerizing the curable composition according to claim 3 with irradiation of active energy ray.

6. The active energy ray curable composition according to claim 1, further comprising at least one polymerization initiator (D) selected from the group consisting of benzoin, benzoin monomethyl ether, benzoin isopropyl ether, acetoin, benzophenone, p-methoxybenzophenone, diethoxyacetophenone, benzyl dimethyl ketal, 1 hydroxycyclohexyl phenyl ketone, methyl phenyl glyoxylate, and 2-hydroxy-2-methyl-1-phenylpropane-1-on.

7. The active energy ray curable composition according to claim 1, further comprising at least one polymerization initiator (D) selected from the group consisting of tetramethyl thiuram monosulphide, tetramethyl thiuram disulphide, 2,4,6-trimethylbenzoyl diphenylphosphine oxide, 2,4,6-trimethylbenzoyl phenylethoxy phosphine oxide, bis (2,4,6-trimethyl benzoyl)-phenyl phosphine oxide, bis (2,6-dimethoxy benzoyl)-2,4,4-trimethyl-pentylphosphine oxide, 2-benzyl-2-dimethylamino-1-(4-morpholino phenyl) butanone-1 and camphorquinone.

8. The active energy ray curable composition according to claim 1, further comprising at least one ultraviolet absorber (E) selected from the group consisting of 2-hydroxy-4-octoxybenzophenone and 2,4-dihydroxy benzophenone, 2-(2-hydroxy-tert-butylphenyl) benzotriazole, and 2-[4-(octyl-2-methylethanoate)oxy-2-hydroxyphenyl]-4,6-[bis(2,4-dimethylphenyl)]-1,3,5-triazine.

\* \* \* \* \*